US012651847B2

(12) United States Patent
Lee et al.

(10) Patent No.: US 12,651,847 B2
(45) Date of Patent: Jun. 9, 2026

(54) ANTENNA STRUCTURE AND IMAGE DISPLAY DEVICE INCLUDING THE SAME

(71) Applicant: DONGWOO FINE-CHEM CO., LTD., Jeollabuk-do (KR)

(72) Inventors: Won Hee Lee, Gyeonggi-do (KR); Byung Eun Jeon, Seoul (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 344 days.

(21) Appl. No.: 18/209,750

(22) Filed: Jun. 14, 2023

(65) Prior Publication Data

US 2023/0420867 A1 Dec. 28, 2023

(30) Foreign Application Priority Data

Jun. 24, 2022 (KR) ........................ 10-2022-0077730

(51) Int. Cl.
| | |
|---|---|
| *H01Q 21/06* | (2006.01) |
| *G01S 13/62* | (2006.01) |
| *H01Q 1/22* | (2006.01) |
| *H01Q 9/04* | (2006.01) |

(52) U.S. Cl.
CPC ............. *H01Q 21/06* (2013.01); *G01S 13/62* (2013.01); *H01Q 1/22* (2013.01); *H01Q 9/0407* (2013.01)

(58) Field of Classification Search
None
See application file for complete search history.

(56) References Cited

U.S. PATENT DOCUMENTS

| | | | | |
|---|---|---|---|---|
| 6,320,542 B1 * | 11/2001 | Yamamoto | ............. | H01Q 21/24 |
| | | | | 343/824 |
| 2015/0369660 A1 * | 12/2015 | Yu | ........................ | G02B 5/008 |
| | | | | 250/339.01 |
| 2017/0363713 A1 * | 12/2017 | Kim | ...................... | G01S 13/931 |
| 2019/0058264 A1 * | 2/2019 | Jung | .................... | H01Q 9/0435 |
| 2020/0021011 A1 * | 1/2020 | Cooper | ................... | G01S 3/48 |
| 2020/0083948 A1 * | 3/2020 | Lim | ...................... | H04B 7/0814 |
| 2020/0209995 A1 * | 7/2020 | So | ......................... | G06F 3/0443 |
| 2022/0059936 A1 * | 2/2022 | Lin | ......................... | G01S 7/352 |
| 2022/0173527 A1 * | 6/2022 | Kim | ...................... | H01Q 1/243 |
| 2023/0361483 A1 * | 11/2023 | Yun | ....................... | H01Q 21/28 |

FOREIGN PATENT DOCUMENTS

| | | | | |
|---|---|---|---|---|
| EP | 2 608 217 A1 | 6/2013 | | |
| EP | 2 800 204 A1 | 11/2014 | | |
| KR | 10-2012-0056698 A | 6/2012 | | |
| WO | WO-2021118198 A1 * | 6/2021 | ............... | H01Q 5/42 |

* cited by examiner

*Primary Examiner* — Dameon E Levi
*Assistant Examiner* — Anh N Ho
(74) *Attorney, Agent, or Firm* — The PL Law Group, PLLC

(57) ABSTRACT

An antenna structure may include a first radiator, a first transmission line connected to the first radiator, a second radiator, a second transmission line connected to the second radiator, a third radiator, and a third transmission line connected to the third radiator. The first radiator, the second radiator and the third radiator may form the same polarization property, and the first transmission line, the second transmission line, and the third transmission line may be fed in parallel to each other.

18 Claims, 5 Drawing Sheets

ANTENNA STRUCTURE AND IMAGE DISPLAY DEVICE INCLUDING THE SAME

CROSS-REFERENCE TO RELATED APPLICATION AND CLAIM OF PRIORITY

This application claims the benefit under 35 USC § 119 of Korean Patent Application No. 10-2022-0077730 filed on Jun. 24, 2022 in the Korean Intellectual Property Office (KIPO), the entire disclosure of which is incorporated herein by reference for all purposes.

BACKGROUND

1. Field

The present invention relates to an antenna structure and an image display device including the same. More particularly, the present invention relates to an antenna structure including a plurality of radiators and an image display device including the same.

2. Description of the Related Art

As information technologies have been developed, a wireless communication technology such as Wi-Fi, Bluetooth, etc., or a non-contact sensing such as a gesture detection and a motion recognition is being applied to or embedded in image display devices, electronic devices and architecture. For example, an antenna for performing communication in a high frequency or ultra-high frequency band is applied to various mobile devices.

For example, the wireless communication technology is combined with a display device in, e.g., a smartphone form. In this case, the antenna may be combined with the display device to provide a communication function.

As the display device to which the antenna is employed becomes thinner and lighter, a space for the antenna may also decrease. Accordingly, the antenna may be included in the form of a film or patch on a display panel so as to insert the antenna in a limited space.

However, when the antenna is disposed on the display panel, a coaxial circuit for transmitting and receiving signals or performing a feeding may not be easily constructed. Further, sensitivity may be lowered, or spatial efficiency and aesthetic property of a structure to which an antenna device is applied may be hindered due to an insertion of a coaxial power supply circuit, For example, Korean Patent Publication No. 10-2014-0104968 discloses an antenna device including an antenna element and a ground element.

SUMMARY

According to an aspect of the present invention, there is provided an antenna structure having improved signaling efficiency and radiation reliability.

According to an aspect of the present invention, there is provided an image display device including the antenna structure.

(1) An antenna structure, including: a dielectric layer; a first radiation unit disposed on the dielectric layer, the first radiation unit including a first radiator and a first transmission line having one end portion connected to the first radiator; a second radiation unit disposed on the dielectric layer, the second radiation unit including a second radiator that has the same polarization direction as that of the first radiator, and a second transmission line having one end portion connected to the second radiator; and a third radiation unit disposed on the dielectric layer, the third radiation unit including a third radiator that has the same polarization direction as that of the first radiator, and a third transmission line having one end portion connected to the third radiator, wherein the other end portion of the first transmission line, the other end portion of the second transmission line and the other end portion of the third transmission line have feeding directions parallel to each other.

(2) The antenna structure according to the above (1), wherein the first transmission line is disposed at the same layer as that of the first radiator, the second transmission line is disposed at the same layer as that of the second radiator, and the third transmission line is disposed at the same layer as that of the third radiator.

(3) The antenna structure according to the above (1), wherein the first transmission line extends in a straight line from the first radiator.

(4) The antenna structure according to the above (3), wherein the second transmission line extends in a straight line from the second radiator, and an extension direction of the first transmission line and an extension direction of the second transmission line are parallel to each other.

(5) The antenna structure according to the above (3), wherein the third transmission line has two bent portions.

(6) The antenna structure according to the above (5), wherein the third transmission line has a feeding portion directly connected to the third radiator, a line portion including the other end portion, and an intermediate portion connecting the feeding portion and the line portion to each other, and an extension direction of the feeding portion is parallel to an extension direction of the line portion and is perpendicular to an extension direction of the intermediate portion.

(7) The antenna structure according to the above (6), wherein the extension direction of the feeding portion is parallel to the extension direction of the first transmission line.

(8) The antenna structure according to the above (5), wherein the second transmission line has two bent portions.

(9) The antenna structure according to the above (1), further including a single circuit board electrically connected to the first radiation unit, the second radiation unit and the third radiation unit.

(10) The antenna structure according to the above (9), wherein the first transmission line, the second transmission line and the third transmission line each includes a solid portion, and the solid portion has a bonding region bonded to the circuit board and a margin region adjacent to the bonding region.

(11) The antenna structure according to the above (10), wherein an area of a margin region of the third transmission line is larger than each area of a margin region of the first transmission line and a margin region of the second transmission line.

(12) The antenna structure according to the above (10), wherein portions of the first transmission line, the second transmission line and the third transmission line except for the solid portion has a mesh structure.

(13) The antenna structure according to the above (1), wherein a center of the first radiator and a center of the second radiator are arranged along a width direction of the dielectric layer, and the center of the second radiator and a center of the third radiator are arranged along a length direction of the dielectric layer.

(14) The antenna structure according to the above (1), further including a fourth radiation unit spaced apart from the first radiation unit, the second radiation unit and the third radiation unit, wherein the fourth radiation unit includes a fourth radiator having the same polarization direction as that of the first radiator and a fourth transmission line having one end portion connected to the fourth radiator.

(15) The antenna structure according to the above (14), wherein the first radiation unit, the second radiation unit and the third radiation unit serve as a reception radiation unit, and the fourth radiation unit serves as a transmission radiation unit.

(16) A motion recognition sensor including the antenna structure according to the above-described embodiments.

(17) A radar sensor including the antenna structure according to the above-described embodiments.

(18) An image display device, including: a display panel; and the antenna structure according to the above-described embodiments disposed on the display panel.

(19) The image display device according to the above (18), wherein the display panel has a display area and a non-display area, and a bottom side of the first radiator and a bottom side of the second radiator are adjacent to an edge in a width direction of the display area, and one lateral side of the second radiator and one lateral side of the third radiator are adjacent to an edge in a length direction of the display area.

(20) The image display device according to the above (18), further including: a motion sensor driving circuit coupled to the antenna structure; and a flexible circuit board electrically connecting the antenna structure and the motion sensor driving circuit.

According to embodiments of the present invention, an antenna structure may include a first radiator, a second radiator and a third radiator which may be driven independently from each other. A first direction in which the first radiator and the second radiator are arranged and a second direction in which the third radiator and the second radiator are arranged may be perpendicular to each other. Accordingly, a strength and a change of a signal in two directions perpendicular to each other may be detected by the antenna structure.

The first radiator, the second radiator and the third radiator may form the same polarization properties. Accordingly, signal efficiency and sensitivity in the first and second directions may be improved, and measurement accuracy may be enhanced.

The antenna structure may include transmission lines disposed at the same layer as that of the radiators and connected to each of the radiators. The transmission lines may be fed in parallel to each other. Thus, a feeding through the transmission lines can be performed through one circuit board.

The antenna structure may further include a transmission radiator. The antenna structure may be electrically coupled to a motion sensor driving circuit or a radar processor through a circuit board. Accordingly, signal information obtained from a sensing target may be transmitted to the motion sensor driving circuit or the radar processor, and a change in position and distance of the sensing target may be measured based on the collected information.

4

Figure 3:
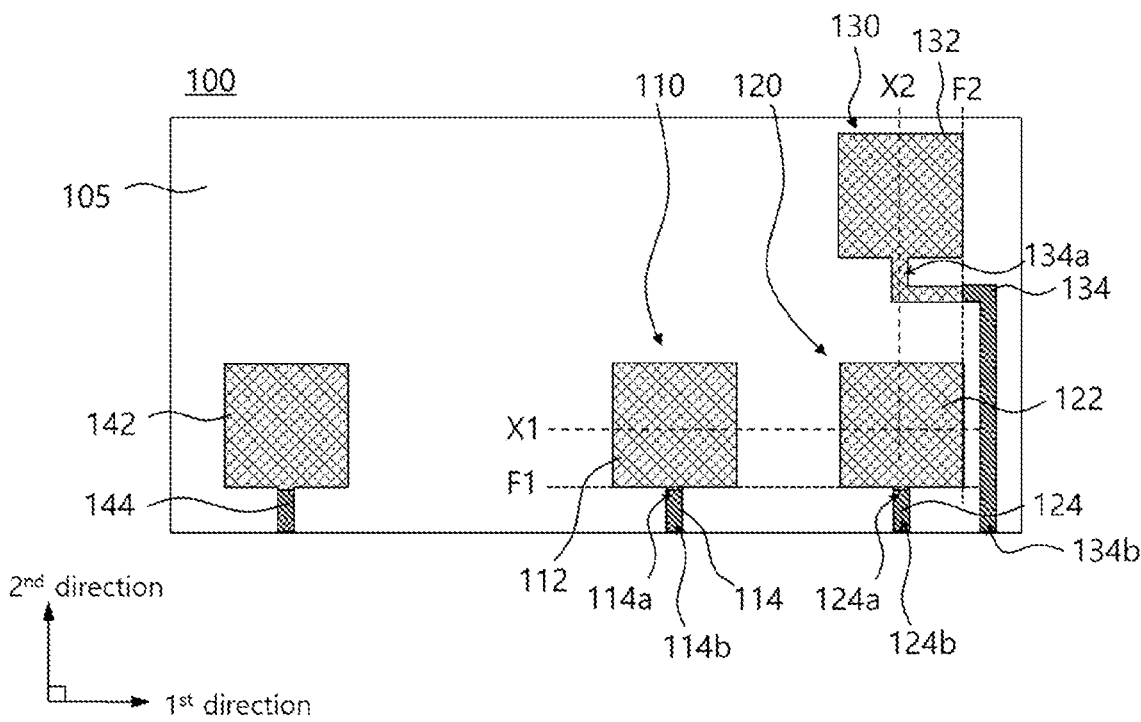

FIG. 3 is a schematic plan view illustrating an antenna structure in accordance with exemplary embodiments.

Figure 4:
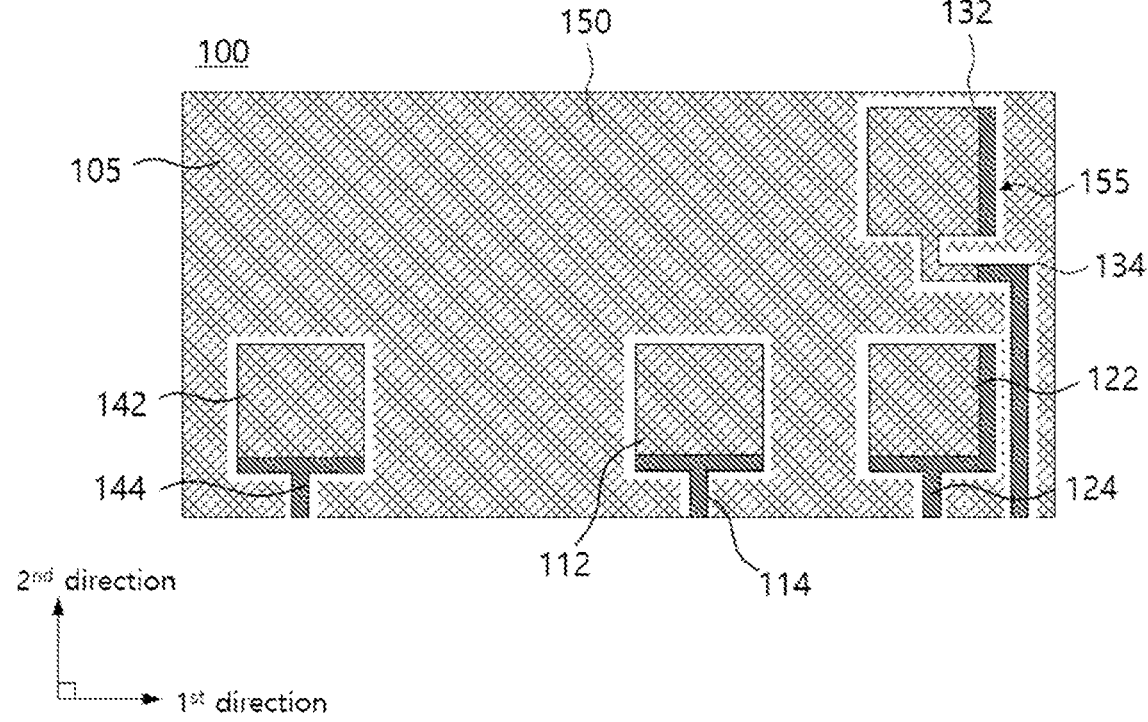

FIG. 4 is a schematic plan view illustrating an antenna structure in accordance with exemplary embodiments.

Figure 5:
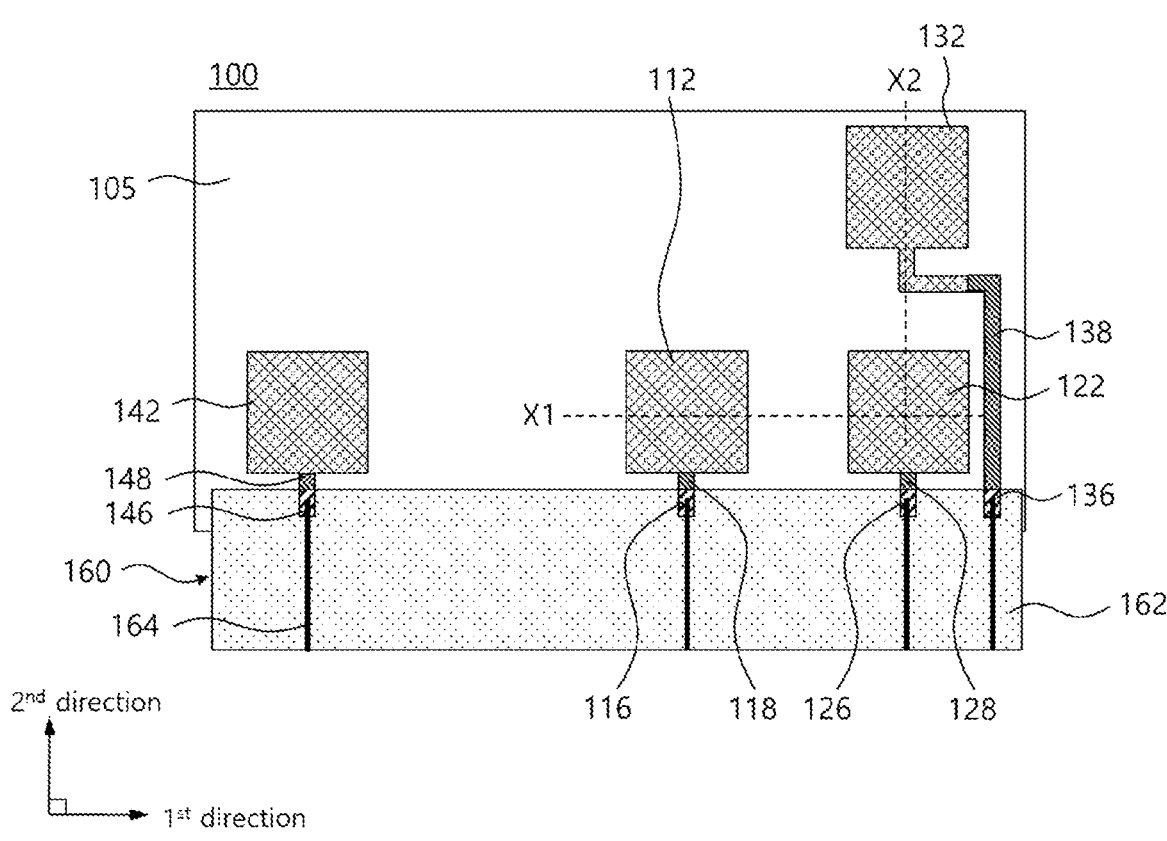

FIG. 5 is a schematic plan view illustrating an antenna structure in accordance with exemplary embodiments.

Figure 6:
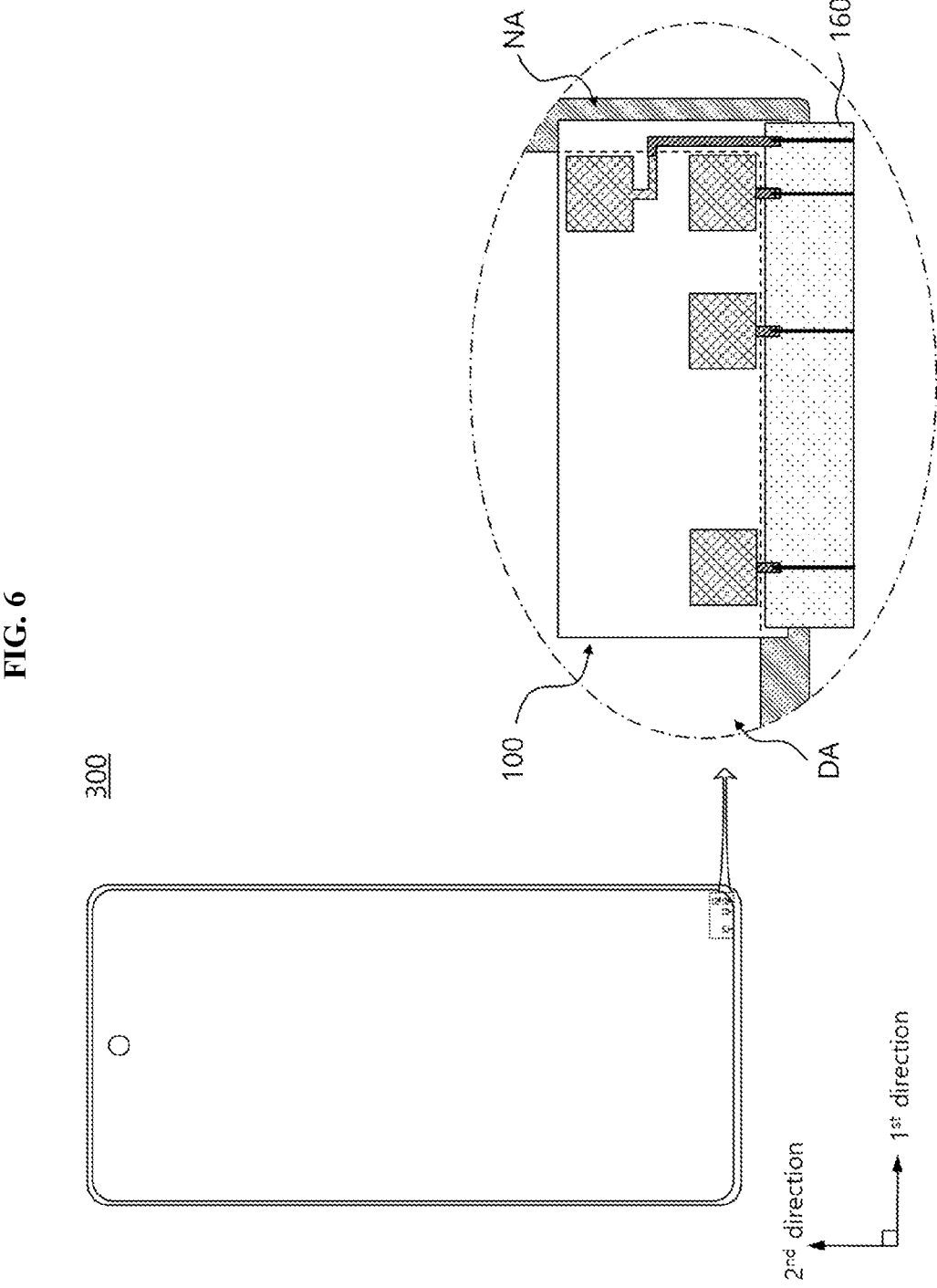
Figure 7:
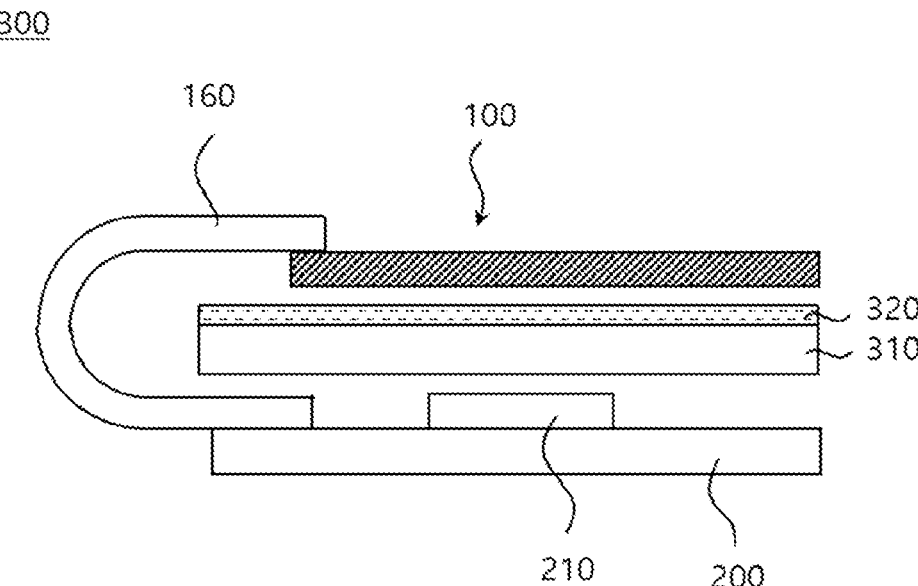

FIGS. 6 and 7 are a schematic plan view and a cross-sectional view illustrating an image display device in accordance with exemplary embodiments.

DETAILED DESCRIPTION OF THE EMBODIMENTS

According to exemplary embodiments of the present invention, an antenna structure including a plurality of radiators arranged in two perpendicular directions.

According to exemplary embodiments of the present invention, an image display device including the antenna structure is also provided. However, an application of the antenna structure is not limited to the display device, and the antenna structure may be applied to various objects or structures such as a vehicle, a home electronic appliance, an architecture, etc.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

The terms "first", "second", "third", "fourth", "one end", "other end", "upper side", "lower side", "upper side", "lower side", etc., as used herein are not intended to limit an absolute position or order, but is used in a relative sense to distinguish different components or elements.

Figure 1:
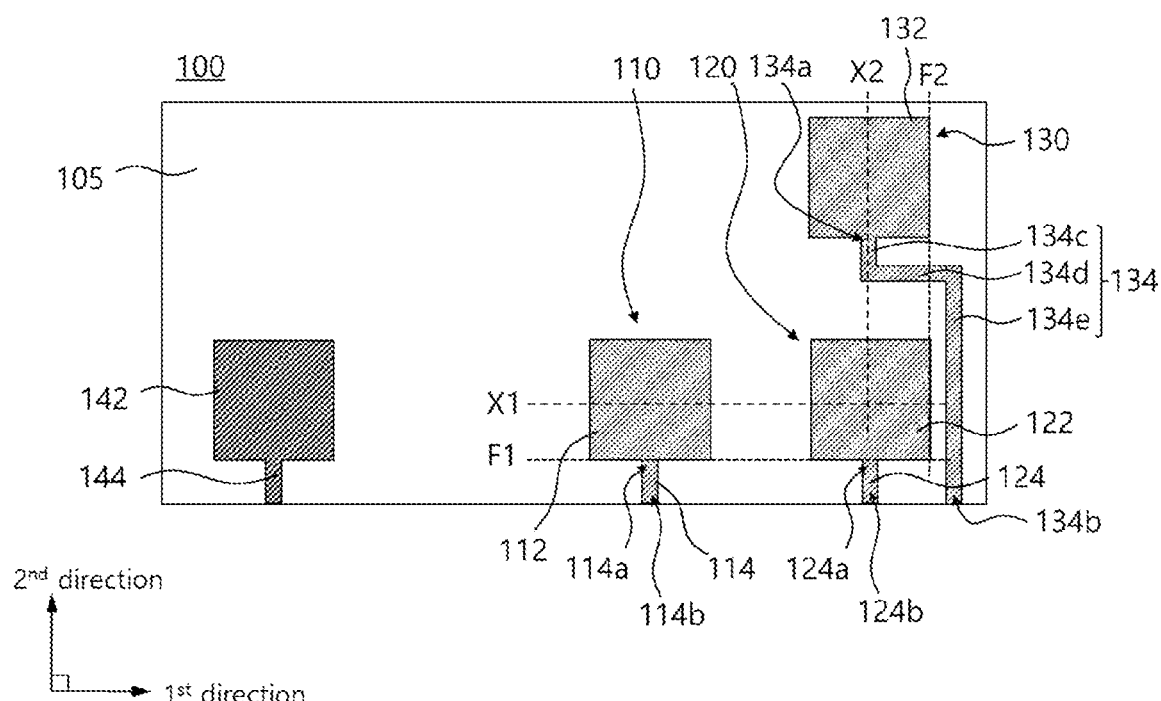
FIGS. 1 and 2 are schematic plan views illustrating antenna structures in accordance with exemplary embodiments.
Figure 2:
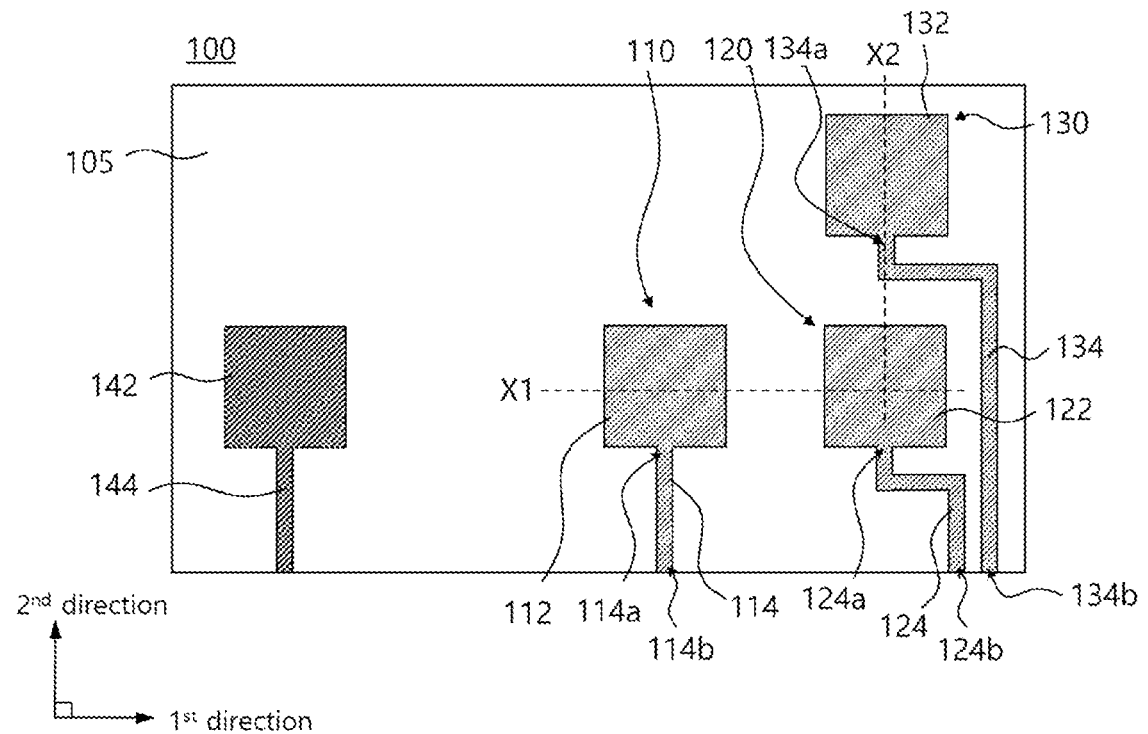

FIGS. 1 and 2 are schematic plan views illustrating antenna structures in accordance with exemplary embodiments.

Referring to FIG. 1, the antenna structure may include a dielectric layer 105, and a first radiation unit 110, a second radiation unit 120 and a third radiation unit 130 disposed on the dielectric layer 105.

The dielectric layer 105 may include, e.g., a transparent resin material. For example, the dielectric layer 105 may include a polyester-based resin such as polyethylene terephthalate, polyethylene isophthalate, polyethylene naphthalate and polybutylene terephthalate; a cellulose-based resin such as diacetyl cellulose and triacetyl cellulose; a polycarbonate-based resin; an acrylic resin such as polymethyl (meth)acrylate and polyethyl (meth)acrylate; a styrene-based resin such as polystyrene and an acrylonitrile-styrene copolymer; a polyolefin-based resin such as polyethylene, polypropylene, a cycloolefin or polyolefin having a norbornene structure and an ethylene-propylene copolymer; a vinyl chloride-based resin; an amide-based resin such as nylon and an aromatic polyamide; an imide-based resin; a polyethersulfone-based resin; a sulfone-based resin; a polyether ether ketone-based resin; a polyphenylene sulfide resin; a vinyl alcohol-based resin; a vinylidene chloride-based resin; a vinyl butyral-based resin; an allylate-based resin; a polyoxymethylene-based resin; an epoxy-based resin; a urethane or acrylic urethane-based resin; a silicone-based resin, etc. These may be used alone or in a combination of two or more thereof.

The dielectric layer 105 may include an adhesive material such as an optically clear adhesive (OCA), an optically clear resin (OCR), or the like. In some embodiments, the dielectric layer 105 may include an inorganic insulating material such as glass, silicon oxide, silicon nitride, silicon oxynitride, etc.

In an embodiment, the dielectric layer 105 may be provided as a substantially single layer.

In an embodiment, the dielectric layer 105 may include a multi-layered structure of at least two layers. For example, the dielectric layer 105 may include a substrate layer and an antenna dielectric layer, and may include an adhesive layer between the substrate layer and the antenna dielectric layer.

Capacitance or inductance for the antenna structure 100 may be formed by the dielectric layer 105, so that a frequency band at which the antenna structure may be driven or operated may be adjusted. In some embodiments, a dielectric constant of the dielectric layer 105 may be adjusted in a range from about 1.5 to about 12. If the dielectric constant exceeds about 12, a driving frequency may be excessively decreased, and driving in a desired high frequency or ultrahigh frequency band may not be implemented.

In some embodiments, a ground layer may be disposed on a bottom surface of the dielectric layer 105. Generation of an electric field in a transmission line may be more promoted by the ground layer, and an electrical noise around the transmission line may be absorbed or shielded.

In some embodiments, the ground layer may be included an individual member of the antenna structure 100. In some embodiments, a conductive member of an image display device to which the antenna structure 100 is applied may serve as the ground layer.

For example, the conductive member may include various electrodes or wirings such as, e.g., a gate electrode, a source/drain electrode, a pixel electrode, a common electrode, a scan line, a data line, etc., included in a thin film transistor (TFT) array of a display panel.

In an embodiment, a metallic member disposed at a rear portion of the display device such as a SUS plate, a sensor member such as a digitizer, a heat dissipation sheet, etc., may serve as the ground layer.

In example embodiments, the first radiation unit 110, the second radiation unit 120 and the third radiation unit 130 may be physically spaced apart from each other on the dielectric layer 105.

The first radiation unit 110 may include a first radiator 112 and a first transmission line 114 connected to the first radiator 112. The second radiation unit 120 may include a second radiator 122 and a second transmission line 124 connected to the second radiator 122. The third radiation unit 130 may include a third radiator 132 and a third transmission line 134 connected to the third radiator 132.

In example embodiments, the first radiator 112 and the second radiator 122 may be arranged in a width direction of the dielectric layer 105.

In FIGS. 1 to 6, a width direction of the dielectric layer and a width direction of a display area may refer to a first direction. In FIGS. 1 to 6, a length direction of the dielectric layer and a length direction of the display area may refer to a second direction.

For example, the first radiator 112 and the second radiator 122 may be spaced apart from each other along a first axis X1 extending in the first direction. The first axis X1 may be an imaginary straight line passing through centers of the first radiator 112 and the second radiator 122 and extending in the first direction.

In example embodiments, the second radiator 122 and the third radiator 132 may be arranged in the second direction.

For example, the second radiator 122 and the third radiator 132 may be spaced apart from each other along a second axis X2 extending in the second direction. The second axis X2 may be an imaginary straight line passing through centers of the second radiator 122 and the third radiator 132 and extending in the second direction.

For example, the first radiator 112, the second radiator 122 and the third radiator 132 may be spaced apart from each other, and may be driven independently. Thus, signal changes in the first direction and the second direction according to positional change of a sensing target may be measured. A motion and a moving distance of the sensing target may be detected through the measured signal changes.

In example embodiments, the first direction and the second direction may be perpendicular to each other. Thus, the antenna structure 100 may detect signal intensities with respect to the sensing target in two axes X1 and X2 orthogonal to each other. For example, the antenna structure may transfer changes of the signal intensities in the two orthogonal axes to a motion sensor driving circuit or a radar processor. Positional changes or distances in all directions on an X-Y coordinate system may be measured by the motion sensor driving circuit or the radar processor based on the collected information.

The antenna structure 100 may be used for a motion sensor for detecting motions and gestures or a radar for detecting the distance. The first radiation unit 110, the second radiation unit 120 and the third radiation unit 130 may be provided as reception radiation units. For example, the first radiator 112, the second radiator 122 and the third radiator 132 may serve as reception radiator for detecting the motion or the distance. For example, the first radiator 112, the second radiator 122 and the third radiator 132 may receive signals reflected from the sensing target.

The second radiator 122 may serve as a reference point for measuring signal changes in the first axis X1 and the second axis X2. For example, the motion of the sensing target may be sensed by measuring the changes of the signal intensities in the first axis X1 and the second axis X2 based on the signal intensity of the second radiator 122.

In some embodiments, each of the radiators 112, 122 and 132 may be designed to have a resonance frequency in a high frequency or ultra-high frequency band of, e.g., 3G, 4G, 5G or higher. For example, the resonance frequency of each of the radiators 112, 122 and 132 may be about 50 GHz or higher, and may be, e.g., in a range from 50 GHz to 80 GHz, or from 55 GHz to 77 GHz.

In some embodiments, a spacing distance in the first direction between the first radiator 112 and the second radiator 122, and a spacing distance in the second direction between the second radiator 122 and the third radiator 132 may be substantially the same.

In this case, the signal intensities in the first direction and the second direction may be measured at regular distance intervals. Accordingly, the signal changes in the first direction and the second direction according to the positional change of the sensing target may be more accurately measured.

In example embodiments, the first radiator 112, the second radiator 122 and the third radiator 132 may have the same polarization properties. For example, a polarization direction of the first radiator 112, a polarization direction of the second radiator 122 and a polarization direction of the third radiator 132 may be the same.

For example, if the first radiator 112 has a linear polarization property in a horizontal direction, the second radiator 122 and the third radiator 132 may also have the linear polarization property in the horizontal direction.

For example, if the first radiator 112 has a linear polarization property in a vertical direction, the second radiator 122 and the third radiator 132 may also have the linear polarization property in the vertical direction.

When a polarization direction of any one of the first radiator 112, the second radiator 122 and the third radiator 132 is different, a signal corresponding to the radiator having the different polarization direction may not be detected. For example, when the polarization direction of the third radiator 132 is different from the polarization direction of the first radiator 112 and the polarization direction of the second radiator 122, the positional change of the sensing target in the second direction may not be sensed.

According to embodiments of the present invention, the polarization direction of the first radiator 112, the polarization direction of the second radiator 122 and the polarization direction of the third radiator 132 may be substantially the same, so that a signal sensitivity in the first direction and a signal sensitivity in the second direction may become uniform.

In example embodiments, one end portion 114a of the first transmission line 114 may be electrically connected to the first radiator 112. One end portion 124a of the second transmission line 124 may be electrically connected to the second radiator 122. One end portion 134a of the third transmission line 134 may be electrically connected to the third radiator 132.

For example, the first transmission line 114, the second transmission line 124 and the third transmission line 134 may transmit a driving signal or a power of an antenna driving integrated circuit (IC) chip to the first radiator 112, the second radiator 122 and the third radiator 132, respectively.

For example, the first transmission line 114, the second transmission line 124 and the third transmission line 134 may transfer an electromagnetic wave signal or electrical signal from the first radiator 112, the second radiator 122 and the third radiator 132, respectively, to the antenna driving IC chip, the motion sensor driving circuit or the radar processor.

In some embodiments, the first transmission line 114, the second transmission line 124 and the third transmission line 134 may be disposed at the same layer or at the same level as that of the first radiator 112, the second radiator 122 and the third radiator 132, respectively.

The transmission lines 114, 124 and 134 may be disposed at the same level as that of the radiators 112, 122 and 132, so that feeding/driving may be performed without a separate coaxial power supply for signal input/output and feeding. Thus, for example, an antenna on display (AoD) in which the antenna structure 100 is disposed on a display panel may be implemented.

In some embodiments, the first transmission line 114, the second transmission line 124 and the third transmission line 134 may be disposed at different layers or at different levels from that of the first radiator 112, the second radiator 122 and the third radiator 132, respectively, on the dielectric layer 105.

In this case, the transmission lines 114, 124 and 134 and the radiators 112, 122 and 132 may be electrically connected to each other through a via.

In example embodiments, polarization directions of the radiators 112, 122 and 132 may be controlled by a feeding direction from the transmission lines 114, 124 and 134 to the radiators 112, 122 and 132. For example, the polarization directions of the radiators 112, 122 and 132 may be determined according to feeding directions of the one end portions 114a, 124a and 134a of the transmission lines.

The feeding direction may be adjusted by an extension direction of a line through which the feeding is performed. For example, when an extension direction of the one end portion 114a of the first transmission line 114 and an extension direction of the one end portion 124a of the second transmission line 124 are parallel to each other, the feeding directions to the first radiator 112 and the second radiator 122 may be parallel to each other. Thus, the first radiator 112 and the second radiator 122 may have the same polarization properties.

In example embodiments, the extension direction of the one end portion 114a of the first transmission line 114, the extension direction of the one end portion 124a of the second transmission line 124, and an extension direction of the one end portion 134a of the third transmission line 134 may be parallel to each other.

In this case, the feeding direction to the first radiator 112, the feeding direction to the second radiator 122 and the feeding direction to the third radiator 132 may be parallel to each other. Accordingly, the polarization direction of the first radiator 112, the polarization direction of the second radiator 122 and the polarization direction of the third radiator 132 may be the same. The radiators may form the same polarization properties, so that reception efficiency and sensitivity of the antenna structure 100 may be enhanced.

In example embodiments, feeding through the other end portions 114b, 124b and 134b of the transmission lines 114, 124 and 134 may be parallel to each other. For example, a feeding direction of the other end portion 114b of the first transmission line, a feeding direction of the other end portion 124b of the second transmission line and a feeding direction of the other end portion 134b of the third transmission line may be parallel to each other.

For example, extension directions of the other end portions 114b, 124b and 134b of the transmission lines 114, 124 and 134 may be parallel to each other. Accordingly, the first transmission line 114, the second transmission line 124 and the third transmission line 134 may extend and drawn out toward the same edge of the dielectric layer 105.

Thus, the first transmission line 114, the second transmission line 124 and the third transmission line 134 may be connected together to the same circuit board. Accordingly, feeding/signal transmission may be performed by one circuit board, and resistance increase and signal loss due to a plurality of circuit structures may be prevented. Further, the complexity of an internal design of an electronic device to which an antenna structure is applied may be reduced.

In example embodiments, each of the first transmission line 114 and the second transmission line 124 may extend in a straight line. For example, the first transmission line 114 may branch from one end of the first radiator 112 and extend in a straight line.

For example, the second transmission line 124 may branch from one end of the second radiator 122 and extend in a straight line.

Thus, a feeding distance for the first radiator 112 and the second radiator 122 may be reduced, and lengths of the transmission lines 114 and 124 electrically connecting the radiators 112 and 122 and an external circuit structure may be decreased to prevent the signal and power loss.

In example embodiments, the third transmission line 134 may have two bent portions. For example, the extension direction of the third transmission line 134 at the one end portion 134a thereof and the extension direction of the third transmission line 134 at the other end portion 134b thereof may be parallel to each other. The third transmission line 134 may include a portion extending in a direction different from the extending direction at the one end portion 134a and the other end portion 134b.

In some embodiments, the third transmission line 134 may include a feeding portion 134c including the one end portion 134a, a line portion 134e including the other end portion 134b, and an intermediate portion 134d connecting the feeding portion 134c and the line portion 134e.

For example, one end of the feeding portion 134c may be directly connected to the third radiator 132, and the other end of the feeding portion 134c may be directly connected to the intermediate portion 134d. One end of the intermediate portion 134d may be directly connected to the feeding portion 134c, and the other end of the intermediate portion 134d may be directly connected to the line portion 134e. One end portion of the line portion 134e may be directly connected to the intermediate portion 134d.

In some embodiments, an extension direction of the feeding portion 134c may be parallel to an extension direction of the line portion 134e and may be perpendicular to an extension direction of the intermediate portion 134d.

For example, the extension directions of the feeding portion 134c and the line portion 134e may be parallel to the extension direction of the first transmission line 114 and the extension direction of the second transmission line 124. The extension direction of the intermediate portion 134d may be perpendicular to the extension directions of the first transmission line 114 and the second transmission line 124.

Accordingly, the third transmission line 134 may avoid the first radiator 112 and the second radiator 122 and extend in the same direction as that of the first transmission line 114 and the second transmission line 124.

Referring to FIG. 2, the second transmission line 124 may also have two bent portions. For example, extension directions of the second transmission line 124 at the one end portion 124a and at the other end portion 124b may be parallel to each other. For example, the extension directions of the one end portion 124a and the other end portion 124b of the second transmission line 124 may be parallel to the extension direction of the first transmission line 114.

The second transmission line 124 may include a portion extending in a direction different from the extending directions at the one end portion 124a and the other end portion 124b.

Thus, the first transmission line 114, the second transmission line 124 and the third transmission line 134 may extend toward the same edge of the dielectric layer 105. Accordingly, the first radiation unit 110, the second radiation unit 120 and the third radiation unit 130 may be connected together to one circuit board.

In some embodiments, as illustrated in FIG. 1, an imaginary straight line F1 extending in the first direction may include a bottom side of the first radiator 112 and a bottom side of the second radiator 122. An imaginary straight line F2 extending in the second direction may include a lateral side of the second radiator 122 and a lateral side of the third radiator 132. For example, the imaginary straight line F2 extending in the second direction may include right sides of the second radiator 122 and the third radiator 132 or left sides of the second radiator 122 and the third radiator 132.

Accordingly, the first radiator 112, the second radiator 122 and the third radiator 132 may be positioned to be adjacent to a corner portion of the dielectric layer 105. For example, the second radiator 122 of the first radiator 112, the second radiator 122 and the third radiator 132 may be the closest to the corner portion of the dielectric layer 105. For example, the corner portion may refer to a region where an edge in the width direction and an edge in the length direction of the dielectric layer 105 meet each other.

Further, a distance between the radiators 112, 122 and 132 and the edge of the dielectric layer 105 may be decreased, thereby reducing the feeding distance. Thus, the feeding loss and signal loss caused by the transmission lines 114, 124 and 134 may be prevented, and an antenna efficiency may be improved.

In example embodiments, the antenna structure 100 may further include a fourth radiation unit 140 disposed to be spaced apart from the first radiation unit 110, the second radiation unit 120 and the third radiation unit 130.

The fourth radiation unit 140 may include a fourth radiator 142 and a fourth transmission line 144 connected to the fourth radiator 142 at the same layer as that of the fourth radiator 142.

The fourth radiation unit 140 may be provided as a transmission radiation unit of the antenna structure 100. For example, the fourth radiator 142 may be provided as a transmission radiator, and radiate an electromagnetic wave toward a sensing target. The first radiator 112, the second radiator 122 and the third radiator 132 may receive the electromagnetic wave signal reflected from the sensing target.

In example embodiments, the first radiator 112, the second radiator 122, the third radiator 132 and the fourth radiator 142 may have the same polarization properties. As the polarization directions of the reception radiation units and the transmission radiation unit may coincide with each other, signal efficiency and sensitivity of the antenna structure 100 may be improved.

For example, when the first radiator 112, the second radiator 122, and the third radiator 132 have a linear polarization property in a vertical direction, the fourth radiator 142 may also have the linear polarization property in the vertical direction.

For example, when the first radiator 112, the second radiator 122 and the third radiator 132 have the linear polarization property in a horizontal direction, the fourth radiator 142 may also have the linear polarization property in the horizontal direction.

In example embodiments, the radiators 112, 122, 132 and 142 and/or the transmission lines 114, 124, 134 and 144 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca) or an alloy containing at least one of the metals. These may be used alone or in a combination of at least two therefrom.

In an embodiment, the radiators 112, 122, 132 and/or 142 and the transmission lines 114, 124, 134 and 144 may include silver (Ag) or a silver alloy (e.g., silver-palladium-copper (APC)), or copper (Cu) or a copper alloy (e.g., a copper-calcium (CuCa)) to implement a low resistance and a fine line width pattern.

In some embodiments, the radiators 112, 122, 132 and 142 and/or the transmission lines 114, 124, 134 and 144 may include a transparent conductive oxide such as indium tin oxide (ITO), indium zinc oxide (IZO), indium zinc tin oxide (ITZO), zinc oxide (ZnOx), etc.

In some embodiments, the radiators 112, 122, 132 and 142 and/or the transmission lines 114, 124, 134 and 144 may include a stacked structure of a transparent conductive oxide layer and a metal layer, and may include, e.g., a double-layered structure of a transparent conductive oxide layer-metal layer, or a triple-layered structure of a transparent conductive oxide layer-metal layer-transparent conductive oxide layer. In this case, flexible property may be improved by the metal layer, and a signal transmission speed may also be improved by a low resistance of the metal layer. Corrosive resistance and transparency may be improved by the transparent conductive oxide layer.

The radiators 112, 122, 132 and 142 and/or the transmission lines 114, 124, 134 and 144 may include a blackened portion, so that a reflectance at a surface of the radiators 112, 122, 132 and 142 and/or the transmission lines 114, 124, 134 and 144 may be decreased to suppress a visual pattern recognition due to a light reflectance.

In an embodiment, a surface of the metal layer included in the radiators 112, 122, 132 and 142 and/or the transmission lines 114, 124, 134 and 144 may be converted into a metal oxide or a metal sulfide to form a blackened layer. In an embodiment, a blackened layer such as a black material coating layer or a plating layer may be formed on the metal layer. The black material or plating layer may include silicon, carbon, copper, molybdenum, tin, chromium, molybdenum, nickel, cobalt, or an oxide, sulfide or alloy containing at least one therefrom.

A composition and a thickness of the blackened layer may be adjusted in consideration of a reflectance reduction effect and an antenna radiation property.

FIG. 3 is a schematic plan view illustrating an antenna structure in accordance with exemplary embodiments.

Referring to FIG. 3, the first radiator 112, the second radiator 122, the third radiator 132 and the fourth radiator 142 may each have a mesh structure. Accordingly, transmittance of the antenna structure 100 may be improved.

In example embodiments, the radiators 112, 122, 132 and 142 and the transmission lines 114, 124, 134 and 144 may entirely include the mesh structure. In one embodiment, at least a portion of the radiators 112, 122, 132 and 142 or at least a portion of the transmission lines 114, 124, 134 and 144 may include a solid structure to improve driving properties the antenna structure and enhance an impedance matching and the feeding efficiency.

For example, end portions of the transmission lines 114, 124, 134 and 144 may have a solid structure. In this case, the end portions of the transmission lines 114, 124, 134 and 144 may serve as signal pads.

In some embodiments, at least a portion of the radiators 112, 122, 132 and 142 may have a solid structure. Accordingly, signal efficiency and antenna gain of the radiators 112, 122, 132, and 142 may be additionally improved. For example, a portion adjacent to an edge of the dielectric layer 105 of the radiators 112, 122, 132 and 142 may have the solid structure.

For example, as illustrated in FIG. 4, the first radiator 112 may have the solid structure at a side to which the first transmission line 114 is connected. The third radiator 132 may have the solid structure at a side physically separated from the third transmission line 134. The second radiator 122 may have the solid structure at two adjacent sides.

In this case, the first radiator 112, the second radiator 122 and the third radiator 132 may be efficiently disposed in a relatively narrow space. Accordingly, spatial efficiency may be improved when being applied to a display device having a narrow bezel area.

In some embodiments, the antenna structure 100 may further include a signal pad. The signal pad may be connected to each of the transmission lines 114, 124, 134 and 144.

In one embodiment, the signal pad may be provided as a member substantially integral with the transmission lines 114, 124, 134 and 144. For example, the other end portion of the transmission lines 114, 124, 134 and 144 may serve as the signal pad.

In some embodiments, a ground pad may be disposed around the signal pad. For example, a pair of the ground pads may face each other with the signal pad interposed therebetween.

The ground pad may be electrically and physically separated from the transmission lines 114, 124, 134 and 144 and the signal pad.

FIG. 4 is a schematic plan view illustrating an antenna structure in accordance with exemplary embodiments.

Referring to FIG. 4, the antenna structure 100 may further include a dummy mesh pattern 150 disposed around the first radiator 112, the second radiator 122, the third radiator 132 and the fourth radiator 142. For example, the dummy mesh pattern 150 may be electrically and physically separated from the radiators 112, 122, 132 and 142 and the transmission lines 114, 124, 134, and 144 by a separation region 155.

For example, a conductive layer containing the above-mentioned metal or alloy may be formed on the dielectric layer 105. A mesh structure may be formed while etching the conductive layer along profiles of the radiators 112, 122, 132 and 142 and transmission lines 114, 124, 134 and 144 as described above. Accordingly, the dummy mesh pattern 150 spaced apart from the radiators 112, 122, 132 and 142 and the transmission lines 114, 124, 134 and 144 by the separation region 155 may be formed.

As the dummy mesh pattern 150 is distributed, optical properties around the radiators 112, 122, 132 and 142 may become uniform, and transmittance of the antenna structure 100 may be improved. Thus, the antenna structure 100 may be prevented from being visually recognized.

FIG. 5 is a schematic plan view illustrating an antenna structure in accordance with exemplary embodiments.

Referring to FIG. 5, the antenna structure 100 may further include a circuit board 160 electrically connected to the first radiation unit 110, the second radiation unit 120, the third radiation unit 130 and the fourth radiation unit 140.

The circuit board 160 may include a core layer 162 and a circuit wiring 164 disposed on the core layer 162. The circuit wiring 164 may be connected to the other end portions 114*b*, 124*b* and 134*b* of the transmission lines 114, 124 134, and 144 to serve as antenna feeding wiring.

For example, one end portion of the circuit wiring 164 may be exposed to an outside, and the exposed one end portion of the circuit wiring 164 may be bonded to the transmission lines 114, 124, 134 and 144. Accordingly, the circuit wiring 164 and the radiation units 110, 120, 130 and 140 may be electrically connected.

The circuit board 160 may include, e.g., a flexible printed circuit board (FPCB). For example, a conductive bonding structure such as an anisotropic conductive film (ACF) may be bonded onto the other end portions of the transmission lines 114, 124, 134 and 144, and then the circuit board 160 may be heat-compressed.

In example embodiments, each of the first transmission line 114, the second transmission line 124, the third transmission line 134 and the fourth transmission line 144 may include a solid portion. The solid portion has a solid structure and may not include a hole or mesh structure therein. Accordingly, resistance of the transmission lines 114, 124, 134 and 144 may be reduced, and the signal and power loss may be prevented.

In some embodiments, the solid portions of the first transmission line 114, the second transmission line 124, the third transmission line 134 and the fourth transmission line 144 may include bonding regions 116, 126, 136 and 146 bonded with the circuit board 160, and margin regions 118, 128, 138 and 148 adjacent to the bonding regions 116, 126, 136 and 146.

In one embodiment, the bonding regions 116, 126, 136 and 146 and the margin regions 118, 128, 138 and 148 may have a solid structure. Accordingly, a contact resistance between the bonding regions 116, 126, 136 and 146 and an external circuit structure may be reduced, and a transfer efficiency of electromagnetic wave and power to the radiator through the margin regions 118, 128, 138 and 148 may be increased.

The bonding regions 116, 126, 136 and 146 may be regions that may be in a direct contact with or bonded to the external circuit structure. The margin regions 118, 128, 138 and 148 may be regions that may not be in contact with or bonded to the external circuit structure. The margin regions 118, 128, 138 and 148 may include remaining portions except for the bonding regions 116, 126, 136 and 146 of the solid portions of the transmission lines 114, 124, 134 and 144.

The bonding regions 116, 126, 136 and 146 for bonding with the external circuit structures may be partially allocated in the transmission lines 114, 124, 134 and 144, and the margin regions 118, 128, 138 and 148 may be additionally allocated. Accordingly, impedance mismatching that may occur in the bonding regions 116, 126, 136 and 146 may be suppressed or buffered while maintaining a desired impedance through the margin regions 118, 128, 138 and 148.

Additionally, a sufficient amount of radiation and power to the radiators 112, 122, 132 and 142 may be achieved through the margin regions 118, 128, 138 and 148.

In example embodiments, the margin region 138 of the third transmission line 134 may have an area greater than the margin region 118 of the first transmission line 114 and the margin region 128 of the second transmission line 124. Thus, even though the length of the third transmission line 134 is relatively larger than each length of the first transmission line 114 and the second transmission line 124, sufficient signal transmission/reception efficiency and antenna gain properties may be implemented while suppressing noise generation and feeding loss.

Thus, the antenna structure 100 may sense a signal change in the first direction and a signal change in the second direction with a balanced sensitivity.

In example embodiments, portions of the transmission lines 114, 124, 134 and 144 except for the solid portions may have a mesh structure.

FIGS. 6 and 7 are a schematic plan view and a cross-sectional view illustrating an image display device in accordance with exemplary embodiments.

FIG. 6 illustrates a front portion or a window surface of the image display device 300. The front portion of the image display device 300 may include a display area DA and a non-display area NA. The non-display area NA may correspond to, e.g., a light-shielding portion or a bezel portion of the image display device 300.

The antenna structure 100 may be disposed toward the front portion of the image display device 300, and may be disposed on, e.g., a display panel. Accordingly, the antenna structure 100 may detect a motion or an operation of a sensing target on the front portion of the image display device 300.

In some embodiments, the antenna structure 100 may be attached to the display panel in the form of a film.

In an embodiment, the antenna structure 100 may be formed throughout the display area DA and the non-display area NA of the image display device 300. In one embodiment, the radiators 112, 122, 132 and 142 may at least partially overlie the display area DA.

As described above, portions having the solid structure of the transmission lines 114, 124, 134 and 144 may be disposed in the non-display area NA. For example, the one end portions 114a, 124a, 134a and 144a may be superimposed on the display area DA, and portions having the solid structure of the other end portions 114b, 124b, 134b and 144b may be disposed in the non-display area NA.

In one embodiment, the bonding regions 116, 126, 136, and 146 and the margin areas 118, 128, 138 and 148 of the transmission lines 114, 124, 134 and 144 may overlap the non-display area NA. The portion having the solid structure may be located in the non-display area NA to prevent an increase of line resistance and signal loss while suppressing a visual recognition of the antenna structure 100.

In some embodiments, the antenna structure 100 may be positioned at a corner portion of the image display device 300. For example, the second radiator 122 may be disposed to be adjacent to the corner portion of the image display device 300 or the corner portion of the display panel.

The first direction of the antenna structure 100 may be parallel to a width direction of the image display device 300, and the second direction may be perpendicular to the width direction of the image display device 300.

In an embodiment, an imaginary straight line including a bottom side of the first radiator 112 and a bottom side of the second radiator 122 or an upper side of the first radiator 112 and an upper side of the second radiator 122 may be adjacent to an edge in the width direction of the display area DA. For example, the bottom side of the first radiator 112 and the bottom side of the second radiator 122 may be poisoned on the edge in the width direction of the display area DA.

Additionally, an imaginary straight line including a right side of the second radiator 122 and a right side of the third radiator 132 or a left side of the second radiator 122 and a left side of the third radiator 132 may be adjacent to an edge in a length direction of the display area DA. For example, the right side of the second radiator 122 and the right side of the third radiator 132 may be positioned on the edge in the length direction of the display area DA.

The second radiator 122 may be adjacent to a vertex or a corner of the display area DA. Accordingly, a feeding distance between the radiators 112, 122, 132 and 142 and the circuit board 160 may be decreased. Accordingly, the lengths of the transmission lines 114, 124, 134 and 144 may be decreased, and a motion sensing performance may be further improved by reducing the signal and power loss.

Referring to FIG. 7, the image display device 300 may include a display panel 310 and the above-described antenna structure 100 disposed on the display panel 310.

In example embodiments, the image display device 300 may further include an optical layer 320 on the display panel 310. For example, the optical layer 320 may be a polarization layer including a polarizer or a polarizing plate.

In an embodiment, a cover window may be disposed on the antenna structure 100. The cover window may include, e.g., glass (e.g., ultra-thin glass (UTG)) or a transparent resin film. Accordingly, an external impact applied to the antenna structure 100 may be reduced or absorbed.

For example, the antenna structure 100 may be disposed between the optical layer 320 and the cover window. In this case, the dielectric layer 105 and the optical layer 320 disposed under the radiators 112, 122, 132 and 142 may commonly function as a dielectric layer of the radiators 112, 122, 132 and 142. Accordingly, an appropriate permittivity may be achieved so that the motion sensing performance of the antenna structure 100 may be sufficiently implemented.

For example, the optical layer 320 and the antenna structure 100 may be laminated through a first adhesive layer, and the antenna structure 100 and the cover window may be laminated through a second adhesive layer.

The circuit board 160 of the antenna structure 100 may be bent along, e.g., a lateral side curved profile of the display panel 310 to be disposed at a rear portion of the image display device 300 and extend toward an intermediate circuit board 200 (e.g., a main board) on which the driving IC chip is mounted. The intermediate circuit board 200 may be a rigid circuit board.

The circuit board 160 and the intermediate circuit board 200 may be bonded or connected to each other through a connector, so that feeding and antenna driving control to the antenna structure 100 by the antenna driving IC chip may be implemented.

In some embodiments, a motion sensor driving circuit 210 may be mounted on the intermediate circuit board 200. In an embodiment, the motion sensor driving circuit 210 may include a proximity sensor, a gesture sensor, an acceleration sensor, a gyroscope sensor, a position sensor, a geomagnetic sensor, etc.

For example, the first circuit board 160 and the second circuit board 170 may be electrically connected to the intermediate circuit board 200, so that signal transmission/reception information of the antenna structure 100 may be transferred to the motion sensor driving circuit 210. Accordingly, a motion recognition sensor including the antenna structure 100 may be provided.

In some embodiments, the first radiation unit 110, the second radiation unit 120, the third radiation unit 130 and the fourth radiation unit 140 may be coupled to the motion sensor driving circuit 210. Accordingly, signal changes in the first axis X1 and the second axis X2 of the antenna structure 100 may be transmitted/provided to the motion sensor driving circuit 210.

The motion sensor driving circuit 210 may measure the motion of the sensing target based on the signal information provided from the antenna structure 100.

For example, the motion of the sensing target in the first direction may be sensed by the second radiator 122 and the first radiator 112. The motion of the sensing target in the second direction may be sensed by the second radiator 122 and the third radiator 132.

In an embodiment, the motion sensor driving circuit 220 may include a motion detection circuit. Signal information transmitted from the antenna structure 100 may be converted/calculated into location information or distance information through the motion detection circuit.

In an embodiment, the antenna structure 100 may be electrically connected to a radar sensor circuit, and thus signal transmission/reception information may be transmitted to a radar processor. For example, the first circuit board 160 and the second circuit board 170 may be electrically connected to the radar processor through the intermediate circuit board 200. Accordingly, a radar sensor including the antenna structure 100 may be provided.

The radar sensor may analyze the transmission/reception signal to detect information on the sensing target. For example, the antenna structure 100 may transmit a trans-mission signal and receive the signal reflected by the sensing target to measure the distance to the sensing target.

For example, the distance of the sensing target may be calculated by measuring a time required for the signal transmitted from the antenna structure 100 to be reflected by the sensing target and received again by the antenna structure 100.

What is claimed is:

1. An antenna structure comprising:
a dielectric layer;
a first radiation unit disposed on the dielectric layer, the first radiation unit comprising a first radiator and a first transmission line having one end portion connected to the first radiator and the other end portion opposite to the one end portion;
a second radiation unit disposed on the dielectric layer, the second radiation unit comprising a second radiator that has the same polarization direction as that of the first radiator, and a second transmission line having one end portion connected to the second radiator and the other end portion opposite to the one end portion;
a third radiation unit disposed on the dielectric layer, the third radiation unit comprising a third radiator that has the same polarization direction as that of the first radiator, and a third transmission line having one end portion connected to the third radiator and the other end portion opposite to the one end portion; and
a fourth radiation unit spaced apart from the first radiation unit, the second radiation unit and the third radiation unit, the fourth radiation unit comprising a fourth radiator and a fourth transmission line, the fourth radiator having the same polarization direction as that of the first radiator, the fourth transmission line having one end portion connected to the fourth radiator,
wherein the other end portion of the first transmission line, the other end portion of the second transmission line, and the other end portion of the third transmission line have feeding directions parallel to each other,
wherein a center of the first radiator, a center of the second radiator and a center of the fourth radiator are arranged along a width direction of the dielectric layer,
wherein an extension direction of the one end portion of the first transmission line, an extension direction of the one end portion of the second transmission line, an extension direction of the one end portion of the third transmission line, and an extension direction of the one end portion of the fourth transmission line are parallel to each other,
wherein the first radiation unit, the second radiation unit and the third radiation unit serve as a reception radiation unit, and the fourth radiation unit serves as a transmission radiation unit.

2. The antenna structure according to claim 1, wherein the first transmission line is disposed at the same layer as that of the first radiator, the second transmission line is disposed at the same layer as that of the second radiator, and the third transmission line is disposed at the same layer as that of the third radiator.

3. The antenna structure according to claim 1, wherein the first transmission line extends in a straight line from the first radiator.

4. The antenna structure according to claim 3, wherein the second transmission line extends in a straight line from the second radiator.

5. The antenna structure according to claim 3, wherein the third transmission line has two bent portions.

6. The antenna structure according to claim 5, wherein the third transmission line has a feeding portion directly connected to the third radiator, a line portion including the other end portion, and an intermediate portion connecting the feeding portion and the line portion to each other, and an extension direction of the feeding portion is parallel to an extension direction of the line portion, and is perpendicular to an extension direction of the intermediate portion.

7. The antenna structure according to claim 6, wherein the extension direction of the feeding portion is parallel to the extension direction of the first transmission line.

8. The antenna structure according to claim 5, wherein the second transmission line has two bent portions.

9. The antenna structure according to claim 1, further comprising a single circuit board electrically connected to the first radiation unit, the second radiation unit and the third radiation unit.

10. The antenna structure according to claim 9, wherein the first transmission line, the second transmission line and the third transmission line each includes a solid portion, and the solid portion has a bonding region bonded to the circuit board and a margin region adjacent to the bonding region.

11. The antenna structure according to claim 10, wherein an area of the margin region of the third transmission line is larger than each area of the margin region of the first transmission line and the margin region of the second transmission line.

12. The antenna structure according to claim 10, wherein portions of the first transmission line, the second transmission line and the third transmission line except for the solid portion has a mesh structure.

13. The antenna structure according to claim 1, wherein the center of the second radiator and a center of the third radiator are arranged along a length direction of the dielectric layer.

14. A motion recognition sensor comprising the antenna structure according to claim 1.

15. A radar sensor comprising the antenna structure according to claim 1.

16. An image display device, comprising:

a display panel; and the antenna structure according to claim 1 disposed on the display panel.

17. The image display device according to claim 16, wherein the display panel has a display area and a non-display area, and a bottom side of the first radiator and a bottom side of the second radiator are adjacent to an edge in a width direction of the display area, and one lateral side of the second radiator and one lateral side of the third radiator are adjacent to an edge in a length direction of the display area.

18. The image display device according to claim 16, further comprising:

a motion sensor driving circuit coupled to the antenna structure; and a flexible circuit board electrically connecting the antenna structure and the motion sensor driving circuit.

\*   \*   \*   \*   \*